United States Patent
Corti

(10) Patent No.: US 9,112,791 B2
(45) Date of Patent: Aug. 18, 2015

(54) METHODS AND APPARATUS FOR PROTECTING A COMMUNICATIONS NETWORK

(75) Inventor: Andrea Corti, Varazze (IT)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 244 days.

(21) Appl. No.: 13/148,736

(22) PCT Filed: Feb. 10, 2009

(86) PCT No.: PCT/EP2009/051493
§ 371 (c)(1),
(2), (4) Date: Nov. 14, 2011

(87) PCT Pub. No.: WO2010/091714
PCT Pub. Date: Aug. 19, 2010

(65) Prior Publication Data
US 2012/0120793 A1    May 17, 2012

(51) Int. Cl.
| | | |
|---|---|---|
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04L 12/707* | (2013.01) | |

(Continued)

(52) U.S. Cl.
CPC ............... *H04L 45/22* (2013.01); *H04L 45/04* (2013.01); *H04L 45/28* (2013.01)

(58) Field of Classification Search
USPC ......................................................... 370/228
See application file for complete search history.

(56) References Cited

U.S. PATENT DOCUMENTS 8,027,245 B2 *   9/2011   Kodialam et al. ............. 370/216
8,089,864 B2 *   1/2012   Beller et al. .................. 370/222
(Continued)

FOREIGN PATENT DOCUMENTS

| EP | 1955497 | 8/2008 |
| WO | 2006056099 | 6/2006 |
| WO | 2007064292 | 6/2007 |

OTHER PUBLICATIONS

International Search Report for PCT/EP2009/051493, mailed Oct. 9, 2009.

(Continued)

*Primary Examiner* — Brian Roberts
*Assistant Examiner* — Shah R Zaman
(74) *Attorney, Agent, or Firm* — Nixon & Vanderhye, P.C.

(57) ABSTRACT

The invention relates in general to a communications network, and more particularly, to methods and apparatus for protecting such a network. The methods and apparatus disclose the providision path protection in a communications network (14) having a plurality of nodes including at least one access node (24, 26, 28, 30). A connection-oriented worker path (23) is set up between a first distribution node (22) and the at least one access node. A connection-oriented protection path (21) is also set up between a second distribution node and the at least one access node. A connection-oriented interface path (52) is also set up between the first and second distribution nodes. Traffic from an upstream node (16, 18) is switched to the interface path (52) at one of the distribution nodes (20, 22). Traffic may be switched to the protection path (21) in response to detecting a fault (54) in the worker path.

28 Claims, 5 Drawing Sheets

(51) Int. Cl.
 *H04L 12/715* (2013.01)
 *H04L 12/703* (2013.01)

(56) References Cited

U.S. PATENT DOCUMENTS

| | | | |
|---|---|---|---|
| 8,165,031 B2* | 4/2012 | Mohan | 370/244 |
| 2006/0036892 A1* | 2/2006 | Sunna | 714/4 |
| 2006/0209682 A1* | 9/2006 | Filsfils et al. | 370/219 |
| 2006/0221813 A1* | 10/2006 | Scudder et al. | 370/216 |
| 2007/0121486 A1* | 5/2007 | Guichard et al. | 370/216 |
| 2007/0253326 A1* | 11/2007 | Saha et al. | 370/217 |
| 2008/0004027 A1 | 1/2008 | Chen et al. | |
| 2009/0175176 A1* | 7/2009 | Mohan | 370/244 |
| 2012/0020207 A1* | 1/2012 | Corti et al. | 370/225 |
| 2012/0188867 A1* | 7/2012 | Fiorone et al. | 370/218 |

OTHER PUBLICATIONS

Bonaventure et al., "Achieving Sub-50 Milliseconds Recovery Upon BGP Peering Link Failures", *IEEE*, vol. 15, No. 5, Oct. 2007, pp. 1123-1135.

Chinese Search Report for Chinese Patent Application No. 200980158710.4, issued Sep. 24, 2013.

* cited by examiner

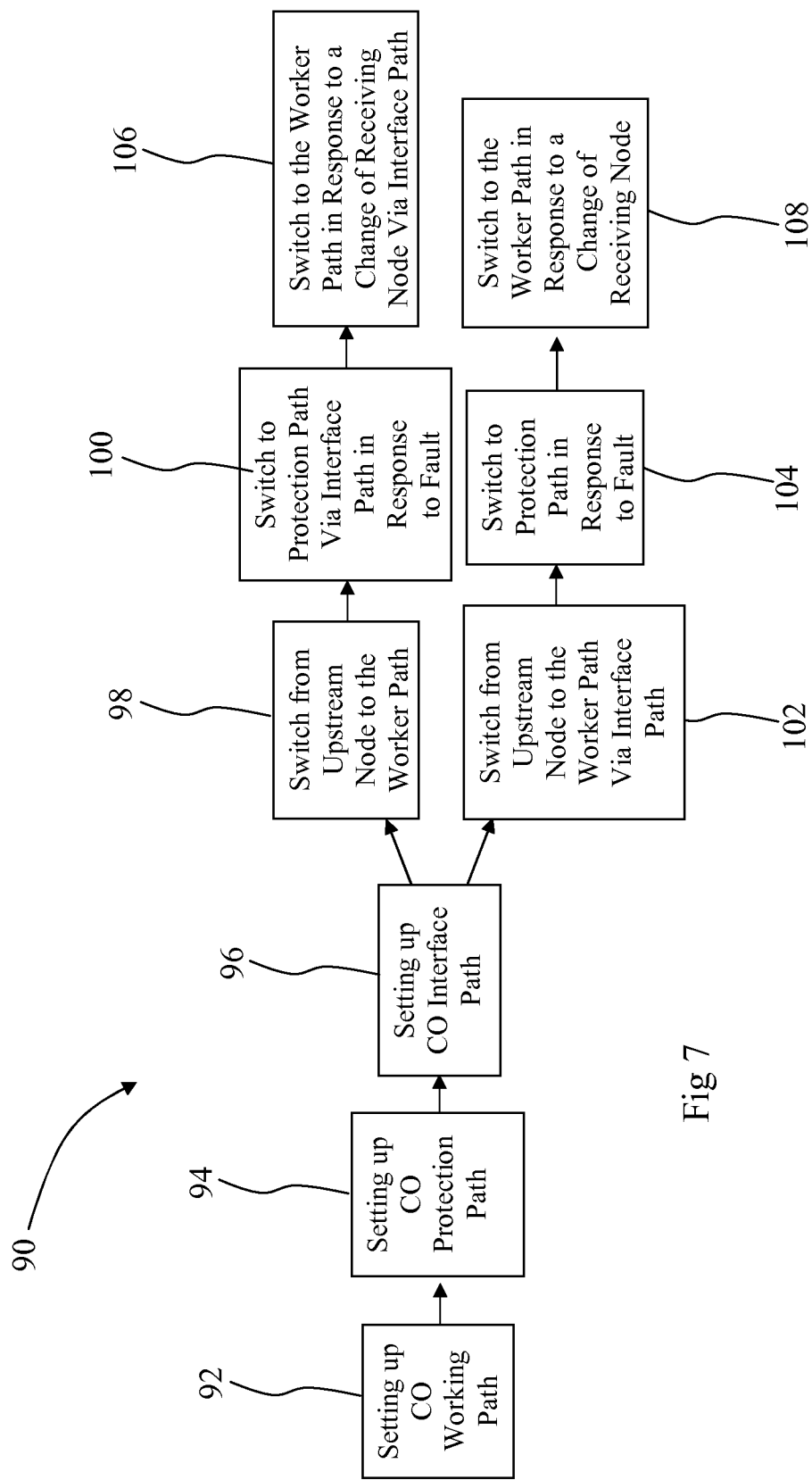

METHODS AND APPARATUS FOR PROTECTING A COMMUNICATIONS NETWORK

This application is the U.S. national phase of International Application No. PCT/EP2009/051493 filed 10 Feb. 2009 which designated the U.S., the entire content of which is hereby incorporated by reference.

TECHNICAL FIELD

The invention relates in general to a communications network, and more particularly, to methods and apparatus for protecting such a network.

BACKGROUND

Telecommunications operators are continuing to develop triple play services which may include the provisioning of high-speed Internet, television/video, and telephone services via a single broadband connection. It is known to use a metro network, also known as a local network, which is a Connection Oriented—Packet Switched (CO-PS) network to provide such services. Technologies such as Multi Protocol Label Switching Transport Profile (MPLS-TP), and Provider Backbone Bridge Traffic Engineering (PBB-TE) have been used in the metro network for this purpose. Up until now such CO-PS networks and the corresponding technology have generally offered the required performance and reliability to satisfy market requirements for triple play services.

Within triple play services the demand for television and video services is increasing. Such television and video services require multicast distribution from a video server to many subscribers which may consume a large bandwidth, and place greater demands on the metro network and underlying technology. These increasing demands have an impact on the ability of telecommunications operators to guarantee the level of service and quality of service that the metro network architecture and technology can offer.

There are many types of protection mechanism that may be used in CO-PS networks to guarantee the level of service and quality of service. Such protection mechanisms aim to provide protection to a network in the event of failures of paths, links or devices within the network so that disruptions to communication services are minimised. A further aim of such protection mechanisms is to avoid loss of traffic in the event of failures within the network.

It is known to provide a redundancy mechanism such as Virtual Router Redundancy Protocol (VRRP) which utilises two edge routers in a core network which are connected to respective edge devices of the metro network. One router acts as a master and the other router operates in a standby condition until required to be used. Such a protection protocol provides protection for traffic passing from the core network to the metro network. The technique delegates protection to the core network at the cost of a complication in redundancy management for the router in the stand-by condition. If a failure is detected in the metro network a fail notification is reported to an edge switching node of the metro network which in turn reports it to the edge router of the core network. This activates protection and starts the sending of traffic towards the standby edge switching node of the core network.

A problem associated with such mechanisms is that they require that a fault in the metro network induces an action or modification in the core network. This is not a straight forward process due to the need for a failure message to propagate from Layer 2 in the metro network to Layer 3 in the core network. Furthermore, using the VRRP the edge switching nodes of the metro network may need to be aware of the master router and be able to modify its traffic forwarding status, or may be required to participate in the router control plane and elect which router is to be used. In addition, when the VRRP is used with an Ethernet tree configuration, each router of the core network is connected to respective edge devices of the metro network, which typically requires two Ethernet worker trees and two Ethernet protection trees to be configured and managed. Overall Layer 3 protocols such as the VRRP add cost and complexity to the metro network which is undesirable.

SUMMARY

What is required is an improved way of providing a protection mechanism to a communications network and to reduce the above-mentioned problems.

According to a first aspect of the invention, there is provided a method of providing path protection in a communications network having a plurality of nodes including at least one access node. The method comprises setting up a connection-oriented worker path between a first distribution node and the at least one access node, and switching traffic from an upstream node to the worker path at the first distribution node. The method includes setting up a connection-oriented protection path between a second distribution node and the at least one access node. The method includes setting up a connection-oriented interface path between the first and second distribution nodes. The method includes switching traffic from the upstream node to the interface path, and switching traffic from the interface path to the protection path at the second distribution node in response to detecting a fault in the worker path.

According to a second aspect of the invention there is provided a method of providing path protection in a communications network having a plurality of nodes including at least one access node. The method comprises setting up a connection-oriented worker path between a first distribution node and the at least one access node. The method comprises setting up a connection-oriented protection path between a second distribution node and the at least one access node. The method comprises setting up a connection-oriented interface path between the first and second distribution nodes. The method comprises switching traffic from an upstream node to the interface path at the second distribution node and switching traffic from the interface path to the worker path at the first distribution node. The method comprises switching traffic from the upstream node to the protection path at the second distribution node in response to detecting a fault in the worker path.

Such a way of providing path protection has the advantage that the involvement of the upstream node in protection mechanisms of the distribution nodes is reduced. Furthermore, when the fault is detected the upstream node, which may be located in a core network, is not required to implement protection switching. This may reduce cost and complexity of protection switching and may assist telecommunications operators to guarantee levels of service and quality of service. In the case of the first aspect of the invention, the traffic may be routed between the first distribution node and the second distribution node to utilise the interface path in response to determining the fault. In the case of the second aspect of the invention, the interface path may be used to relay traffic to the worker path, and traffic may be routed to the protection path in the event of the fault. Such arrangements provide a more robust way of providing protection to a communications network than prior techniques and is advantageous for the overall network reliability.

In one aspect the method may further include switching traffic from the upstream node to the interface path at the second distribution node and switching traffic from the interface path to the worker path at the first distribution node in response to a change of the distribution node receiving the traffic.

In another aspect the method may further include switching traffic from the upstream node to the worker path at the first distribution node in response to a change of the distribution node receiving the traffic.

Such arrangements may provide the advantage that a protection switching event of the upstream node does not require traffic to be switched from the worker path to the protection path.

Preferably the method further including sharing at least one common intermediate node in the worker path and/or the protection path to communicate with the at least one access node. This may further improve the protection provided by the protection path.

The method may further include transmitting the traffic from the first or second distribution node to a plurality of access nodes. The method further includes multicasting the traffic from the first or second distribution node to the plurality of access nodes.

In a preferred embodiment the method further includes using a worker tree or a protection tree for at least a part of the worker path and/or the protection path.

Preferably the method further includes using Multi Protocol Label Switching (MPLS), or Multi Protocol Label Switching-Transport Profile (MPLS-TP), or an Ethernet Protocol for at least a part of the worker path and/or the protection path and/or the interface path.

Preferably the method further includes using a control message from one distribution node to the other distribution node to initiate switching traffic. Preferably the method further includes using the interface path for communication of the control message.

The method may further include using an edge node of a local network for at least one of the distribution nodes. The method may further include using an edge router of a core network for the upstream node.

In one embodiment the method further includes providing connection-oriented paths between the first and second distribution nodes and respective upstream nodes.

According to a third aspect of the invention there is provided a node arrangement for a communications network having at least one access node. The node arrangement comprising a first distribution node and a second distribution node having a connection-oriented interface path between them. The first distribution node operable to switch traffic from an upstream node to a connection-oriented worker path to the at least one access node. The second distribution node having a connection-oriented protection path to the at least one access node. The first distribution node operable to switch traffic from the upstream node to the interface path, and the second distribution node operable to switch traffic from the interface path to the protection path in response to detection of a fault in the worker path.

According to a fourth aspect of the invention there is provided a node arrangement for a communications network having at least one access node. The node arrangement comprising a first distribution node and a second distribution node having a connection-oriented interface path between them. The first distribution node having a connection-oriented worker path to the at least one access node. The second distribution node having a connection-oriented protection path to the at least one access node. The second distribution node operable to switch traffic from the upstream node to the interface path, and the first distribution node operable to switch traffic from the interface path to the worker path. The second distribution node operable to switch traffic from an upstream node in response to detection of a fault in the worker path.

In one aspect the second distribution node is operable to switch traffic from the upstream node to the interface path, and the first distribution node is operable to switch traffic from the interface path to the worker path in response to a change of the distribution node receiving the traffic.

In another aspect the first distribution node is operable to switch traffic from the upstream node to the worker path in response to a change of the distribution node receiving the traffic.

Preferably the worker path and/or the protection path have at least one common intermediate node for communication with the at least one access node.

The first or second distribution node may be operable to transmit traffic to a plurality of access nodes. The first or second distribution node are operable to multicast the traffic to the plurality of access nodes.

In a preferred embodiment at least a part of the worker path and/or the protection path include a worker tree and/or a protection tree.

Preferably at least a part of the worker path and/or the protection path and/or the interface path are operable to use Multi Protocol Label Switching (MPLS), or Multi Protocol Label Switching-Transport Profile (MPLS-TP), or an Ethernet Protocol.

Preferably the node arrangement is operable to initiate switching traffic using a control message from one distribution node to the other distribution node. Preferably the interface path is operable for communication of the control message.

At least one of the distribution nodes may be an edge node of a local network. The upstream node may be an edge router of a core network.

In one embodiment each of the first and second distribution nodes are arranged to have a connected-oriented communication path with a respective upstream node.

According to a fifth aspect of the invention there is provided a communications network using a method of the first or second aspects of the invention, or including a node arrangement of the third or fourth aspects of the invention.

BRIEF DESCRIPTION OF THE DRAWINGS

Other features of the invention will be apparent from the following description of preferred embodiments shown by way of example only with reference to the accompanying drawings, in which;

FIG. 7 is a flow diagram illustrating a method according to an embodiment of the invention.

DETAILED DESCRIPTION

Figure 1:
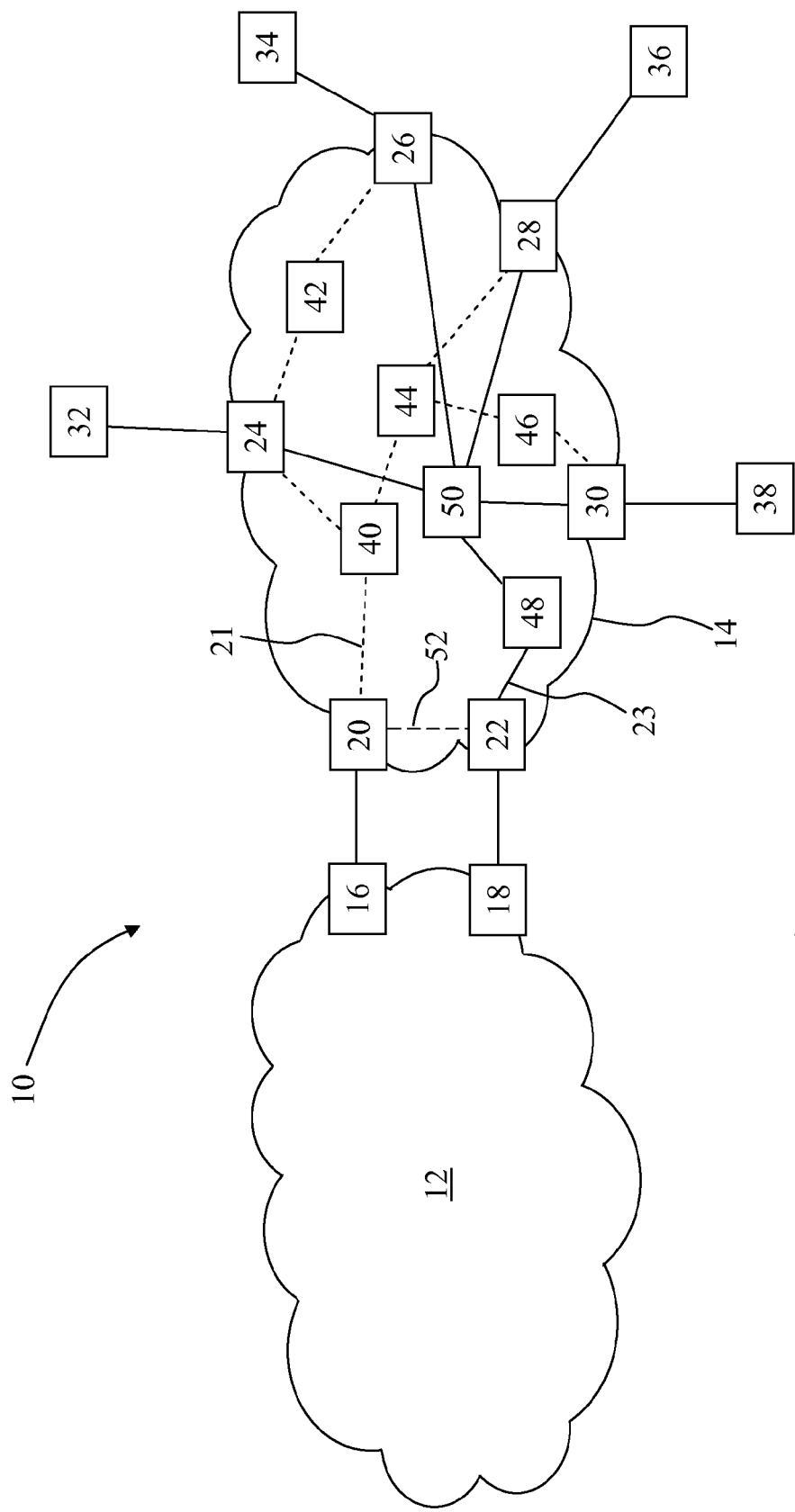
FIG. 1 shows a communications network comprising a core network and a metro network according to an embodiment of the invention.

FIG. 1 shows a communications network, generally designated 10, comprising a core network 12 in communication with a metro network 14 according to an embodiment of the invention. The core network 12 is a Layer 3 transport network, for example, based on routers, whereas the metro network 14 is comprised of switching devices, such as bridges, which support Layer 2 traffic. The metro network 14 is a Connection Oriented Packet Switched (CO-PS) network, and the core network may be a CO-PS network or a Connectionless (CL) network. It will be appreciated that the core network 12 may also be known as a backbone network, and the metro network 14 may also be known as a local network. FIG. 1 shows the normal operation of the core network 12 and the metro network 14 when no faults are present.

The core network 12 has two edge routers 16, 18 which are connected to respective edge switching devices 20, 22, such as Ethernet bridges, of the metro network 14. The edge switching devices 20, 22 may alternatively be termed as a first distribution node 22 and a second distribution node 20. The two edge routers 16, 18 may alternatively be termed as upstream nodes 16, 18 relative to the switching devices 20, 22.

The switching devices 20, 22 of the metro network 14 form respective root nodes of a connection-oriented protection tree 21, and a connection-oriented worker tree 23 which both communicate with four access nodes 24, 26, 28, 30. The protection tree 21 and the worker tree 23 may also be known as protection and worker paths respectively. The access nodes 24, 26, 28, 30 are connected to respective user nodes 32, 34, 36, 38 for connection to users. The metro network 14 also includes a plurality of intermediate nodes 40, 42, 44, 46, 48, 50 which are arranged between the edge switching devices 20, 22 and the access nodes 24, 26, 28, 30. FIG. 1 also shows that the two edge switching devices 20, 22 are connected to one another by a connection-oriented interface path 52.

The protection tree 21 comprises the edge switching device 20 which is in communication with the intermediate node 40. The intermediate node 40 is in communication with each of the access node 24 and the intermediate node 44. The access node 24 is in communication with the intermediate node 42 which is in communication with the access node 26. The intermediate node 40 is in communication with the intermediate node 44. The intermediate node 44 is in communication with each of the access node 28 and the intermediate node 46. The intermediate node 46 is in communication with the access node 30. The protection tree 21 is shown with a dotted line.

The worker tree 23 comprises the edge switching device 22 which is in communication with the intermediate node 48. The intermediate node 48 is in communication with the intermediate node 50. The intermediate node 50 is in communication with each of the access nodes 24, 26, 28, 30. The worker tree 21 is shown with a solid line.

Under normal operation of the communications network 10 the edge router 18 of the core network 12 is the master router, and the edge router 16 is in a standby condition. Traffic from the core network 12 to the metro network 14 passes from the edge router 18 to the edge switching device 22 and on to the worker tree 23. Alternatively, traffic from the core network 12 to the metro network 14 passes from the edge router 18 to the edge switching device 20 and on to the edge switching device 22 via the interface path 52 where it then passes to the worker tree 23. The protection tree 21 provides redundancy for the worker tree 23. The edge switching devices 20, 22 and the wider metro network 14 are not required to be aware which edge router 16, 18 is performing as the master router. However, each edge switching device 20, 22 must be aware whether the worker tree 23 or the protection tree 21 is operational and sending traffic to the access nodes 24, 26, 28, 30.

Whereas the two edge routers 16, 18 are shown at the edge of the core network 12, and the edge switching devices 20, 22 are shown at the edge of the metro network 14, these devices may actually be anywhere within the core network 12 or the metro network 14 respectively. Where certain parts of the core network 12 and the metro network 14 begin and end within the overall network 10 may vary such that in some embodiments the edge routers 16, 18 may not actually be at the edge of the core network 12 but slightly within the core network 12. Furthermore in some embodiments the edge switching devices 20, 22 may not be actually at the edge of the metro network 14 but slightly within the metro network 14.

It will also be appreciated that the paths between the edge switching devices 20, 22, the intermediate nodes 40, 42, 44, 46, 48, 50, the access nodes 24, 26, 28, 30 and the user nodes 32, 34, 36, 38 are via links which may be optical fibres, such that there may be many paths within the same link.

Figure 2:
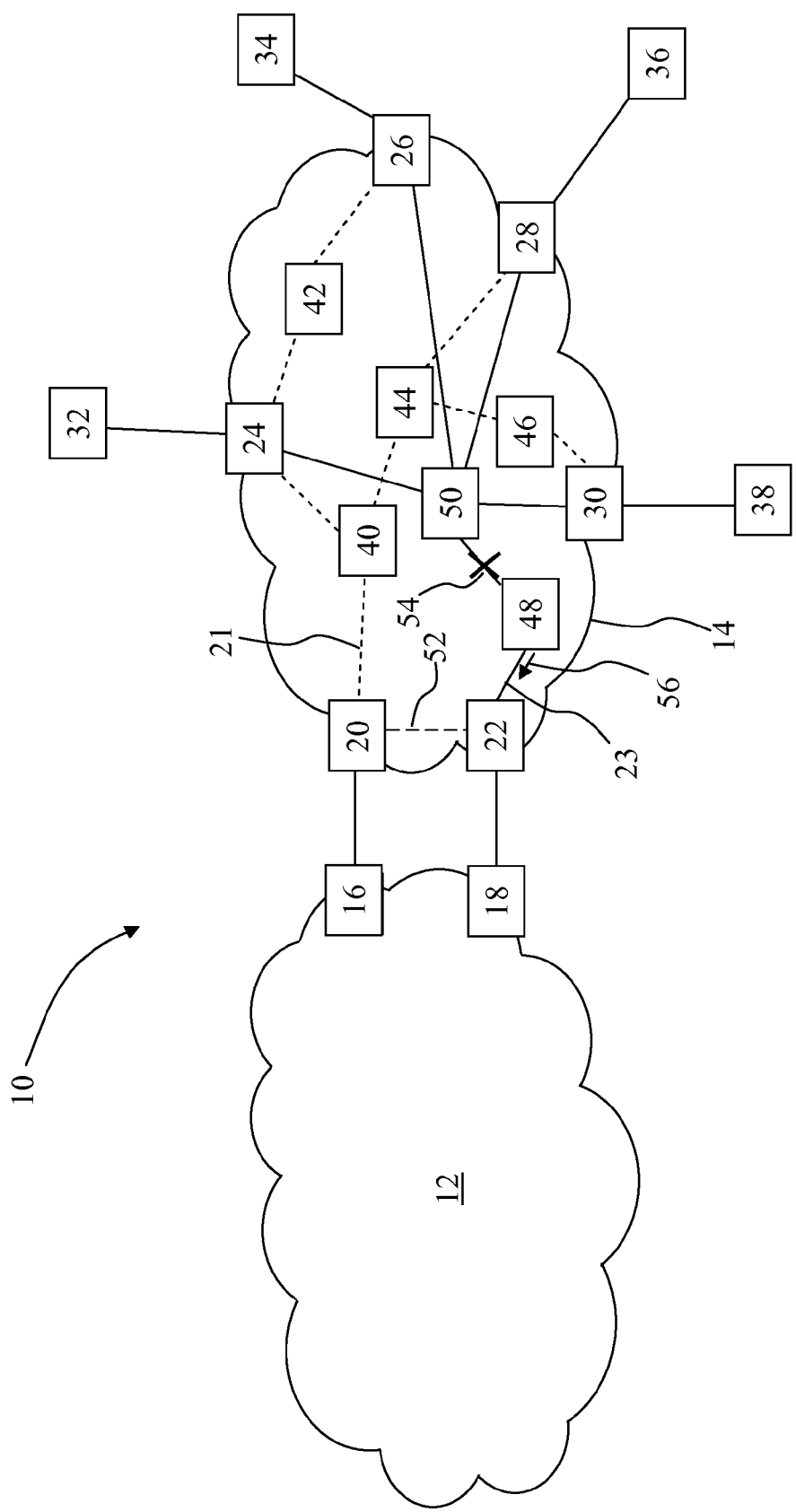
FIG. 2 shows the communications network of FIG. 1 with a failure in the metro network.

FIG. 2 shows the communications network 10 of FIG. 1 with a failure 54 in the metro network 14. The failure 54 causes a break in the connection between the intermediate nodes 48 and 50 of the worker tree 23 such that communication with the access nodes 24, 26, 28, 30 using the worker tree 23 has been lost. The failure 54 causes a failure message 56 to be sent from the intermediate node 48 to the edge switching device 22. Such behaviour is achieved by using messages which are part of the Operations, Administration and Maintenance (OAM) capabilities embedded within Ethernet as described in the standard ITU-T Y(1731). The failure message 56 may be for example, an Alarm Indication Signal (AIS), or an Automatic Protection Switching (APS) message. The failure notification can also be based on relevant OAM capabilities within the forwarding plane, such as Multi Protocol Label Switching (MPLS).

In the case where traffic is passed from the edge router 18 to the edge switching device 22, the failure message 56 causes the edge switching device 22 to switch traffic to the edge switching device 20 via the interface path 52 and on to the protection tree 21. In the case where the traffic is passed from the router 18 to the edge switching device 20, the failure message 56 causes the edge switching device 20 to switch traffic on to the protection tree. In either case the protection tree 21 is utilised for sending traffic to the access nodes 24, 26, 28, 30 in the even of the failure 54.

Figure 3:
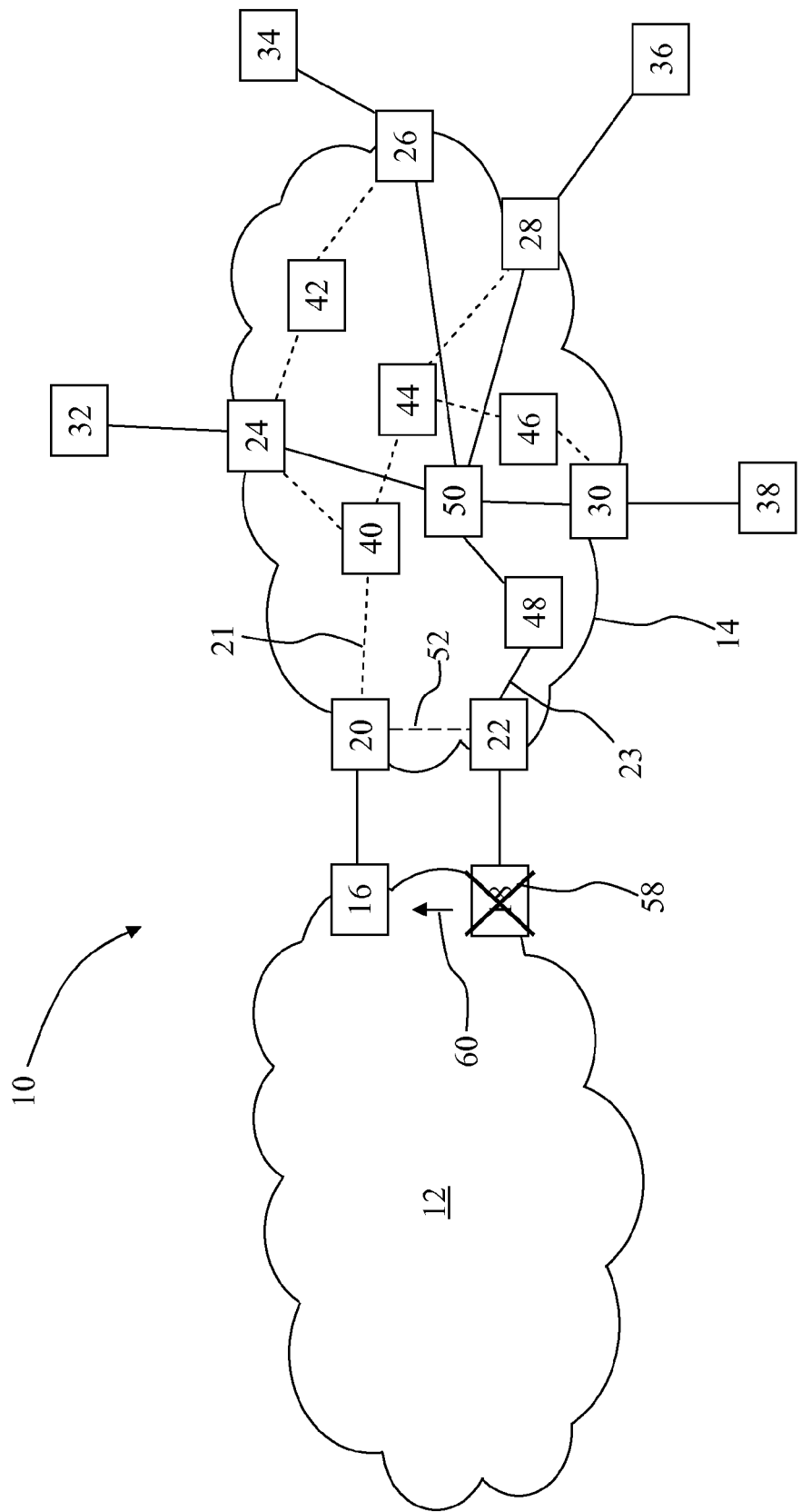
FIG. 3 shows the communications network of FIG. 1 with a failure in the core network.

FIG. 3 shows the communications network 10 of FIG. 1 with a failure 58 in the core network 12. The failure 58 may be a failure of the edge router 18, or a failure of the link between the edge router 18 and the edge switching device 22, or any other failure requiring traffic to be sent from the core network 12 to the edge switching device 20 of the metro network 14. In this situation the standby edge router 16 now becomes the master router. The failure 58 causes a break in the connection between the edge router 18 of the core network 12 and the switching device 22 of the metro network 14 such that communication with the access nodes 24, 26, 28, 30 using the worker tree 23 has been lost. The failure 58 causes a failure message 60, such as an OAM message, to be sent from the edge router 18 of the core network 12 to the edge router 16 of the core network. The failure message 60 may be any alert message associated to any protocol operating between the edge routers 16, 18. The failure message 60 causes the edge router 16 to send traffic to the edge switching device 20 and then on to the edge switching device 22 via the interface path 52. In this arrangement the worker tree 23 is still utilised for sending traffic to the access nodes 24, 26, 28, 30.

Since the failure 58 is not initiated in the metro network 14 no fail notification is sent to the edge switching devices 20, 22. The edge switching devices 20, 22 continue processing traffic independent of the edge router that is acting as the master router. Both edge switching devices 20, 22 are configured to forward traffic to the trees providing service to the access nodes 24, 26, 28, 30, which in this scenario is the worker tree 23, whereby the protection tree 21 is in a standby condition.

Figure 4:
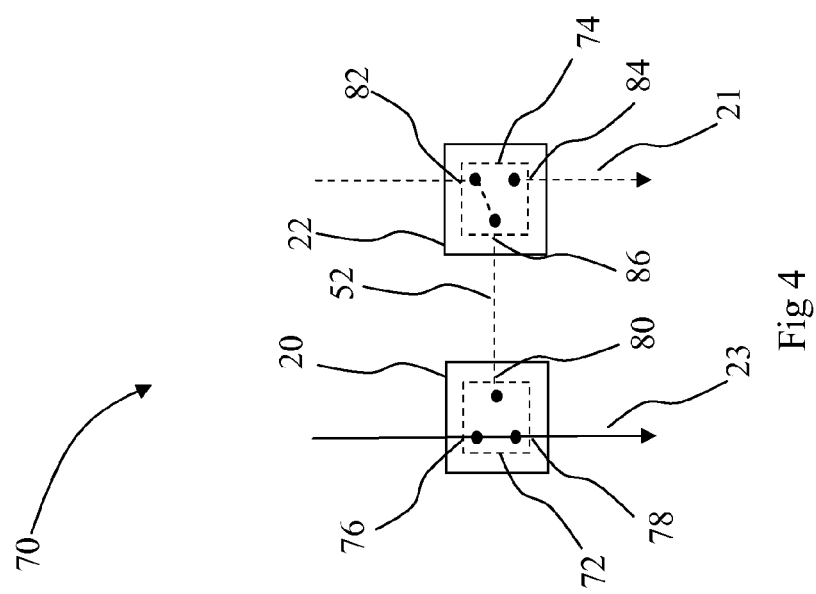
FIG. 4 shows an arrangement of the edge switching devices of the communications network of FIG. 1 under normal operation.

FIG. 4 shows the arrangement of the edge switching devices 20, 22 of the communications network of FIG. 1 under normal operation is shown with no faults present, generally indicated at 70. Each edge switching device 20, 22 has a respective selector device 72, 74. The selector device 72 of the edge switching device 20 has an input port 76 to receive traffic from the edge router 18, and an output port 78 to transmit traffic to the worker path 23. The selector device 72 also has a protection port 80 which can operate to receive traffic from the edge switching device 22 or to transmit traffic to the edge switching device 22 via the interface path 52. In a similar manner, the selector device 74 of the edge switching device 22 has an input port 82 to receive traffic from the edge router 16, and an output port 84 to transmit traffic to the interface path 21. The selector device 74 also has a protection port 86 which is in communication with the protection port 80 to receive traffic from the edge switching device 20 or to transmit traffic to the edge switching device 20 via the interface path 52.

In FIG. 4 the worker tree 23 is shown to be active and the selector device 72 is shown to be operational to select the traffic flow from the input port 76 and pass it to the output port 78. The edge switching device 22 knows that the worker tree 23 is the worker path and is ready to select the traffic flow from the input port 82 and pass it to the output port 84 towards the edge switching device 20 via the protection path 52.

Figure 5:
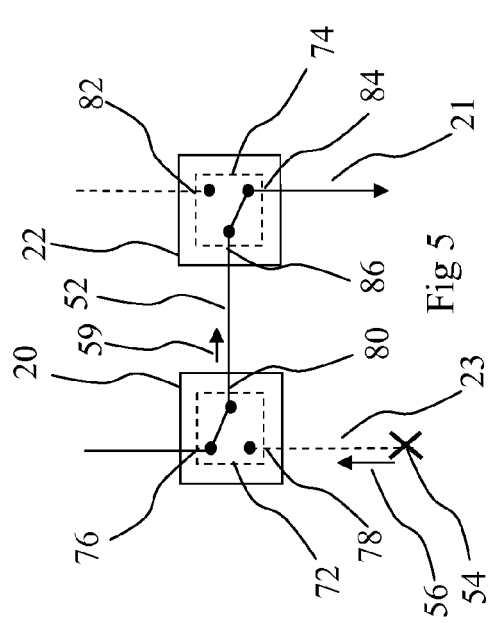
FIG. 5 shows the failure in the metro network of FIG. 2 in greater detail.

FIG. 5 shows the failure in the metro network 14 of FIG. 2 in greater detail. In FIG. 5 like features to the arrangement of FIG. 4 are shown with like reference numerals. In FIG. 5 the fault 54 is shown to prevent the worker tree 23 from operating. The fault message 56 propagates a failure indication and informs the selector device 72 that it cannot send traffic from the edge switching device 20 to the worker tree 23. A failure message 59 also propagates from the selector device 72 to the selector device 74 to notify the failure of the worker path 23. Alternatively the selector device 74 of the edge switching device 22 may be informed of the failure 54 by the access nodes 24, 26, 28, 30 detecting a loss of connectivity. In response the selector device 72 switches to send the traffic received at the input port 76 to the protection port 80 so that it is passed to the edge switching device 22 via the interface path 52. The selector device 74 of the edge switching device 22 then operates to select the traffic flow from the protection port 86 and pass it to the output port 84 to the protect tree 21. In an alternative arrangement when traffic is received from the core network 12 at the edge switching device 22, the selector device 74 can select the traffic flow from the input port 82 of the selector device 74 and pass it to the output port 84 and on to the protect tree 21. In either scenario the edge routers 16, 18 of the core network are not aware of the failure 54.

Figure 6:
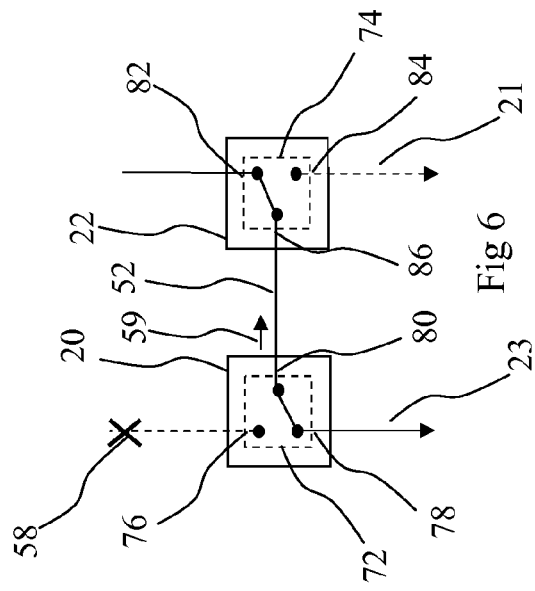
FIG. 6 shows the failure in the core network of FIG. 3 in greater detail.

FIG. 6 shows the failure in the core network 12 of FIG. 3 in greater detail. In FIG. 6 like features to the arrangement of FIG. 4 are shown with like reference numerals. In FIG. 6 the failure 58 in the core network 12 is shown to prevent the traffic from being received by the input port 76 of the selector device 72. In response the selector device 74 receives traffic at the input port 82 from the edge router 16 and passes it to the protection port 86 and on to the selector device 72 via the interface path 52. In response the selector device 72 then sends the traffic received at the protection port 80 to the output port 78 to the worker tree 23. Both edge switching devices 20, 22 know that the worker tree 23 is the worker path and forward traffic accordingly. Failure notification between the edge switching device 20 and the edge switching device 22 is optionally provided by the fault message 59. The selector device 74 may also select the traffic flow from the input port 82 and pass it to the output port 84 and on to the protect tree 21 in case of failure of the working path 23.

In the arrangements of FIGS. 4-6 the edge switching devices 20, 22 are required to know which of the worker tree 23 and the protection tree 21 are operational at any given time so that traffic is passed to the access nodes 24, 26, 28, 30 via the appropriate tree. Such notification is most conveniently performed using the OAM message 56, and to optionally by the OAM message 59. It will be appreciated that the interface path 52 is shown as a bidirectional link which may be provided by two unidirectional links in either direction.

FIG. 7 is a flow diagram illustrating a method of providing path protection according to an embodiment of the invention, generally designated 90. The method 90 relates to the metro network 14 which has a plurality of nodes including at least one access node, such as access nodes 24, 26, 28, 30. The method comprises setting up a connection-oriented worker path shown at 92, which may be the worker tree 23 which permits traffic to flow between the first distribution node 22 and the at least one access node 24, 26, 28, 30. The first distribution node 22 is in communication with a node of the core network 12 which may be the edge router 18. The method then includes setting up a connection-oriented protection path shown at 94, which may be the protection tree 21 to permit traffic to flow between the second distribution node 20 of the metro network 14 and at least one access node 24, 26, 28, 30. The method then includes setting up a connection-oriented interface path 52 between the first and second distribution nodes as shown at 96.

In one arrangement the method includes switching traffic from an upstream node 16, 18 to the worker path at the first distribution node 22 as shown at 98. The method then includes switching traffic from the upstream node 16, 18 to the interface path 52, and switching traffic from the interface path 52 to the protection path 21 at the second distribution node 20 in response to detecting a fault 54 in the worker path 23, as shown at 100. The method may further include switching traffic from the upstream node 16, 18 to the interface path 52 at the second distribution node 20 and switching traffic from the interface path to the worker path 23 at the first distribution node 22 in response to a change of the distribution node 20, 22 receiving the traffic, as shown at 106

In another arrangement the method includes switching traffic from an upstream node 16, 18 to the interface path 52 at the second distribution node 20 and switching traffic from the interface path 52 to the worker path 23 at the first distribution node 22, as shown at 102. The method then includes switching traffic from the upstream node 16, 18 to the protection path 21 at the second distribution node 20 in response to detecting a fault 54 in the worker path 23, as shown at 104. The method may include switching traffic from the upstream node 16, 18 to the worker path 23 at the first distribution node 20 in response to a change of the distribution node 20, 22 receiving the traffic, as shown at 108.

The method may include using at least one common intermediate node 40, 42, 44, 46, 48, 50 in the worker path 23 and/or the protection path 21 to communicate with the at least one access node 24, 26, 28, 30. This may further improve the protection offered by the protection tree 21.

It will be understood that the worker tree 23 and the protection tree 21 are both trees that may implement rooted multipoint Ethernet Virtual Connections (EVC), also known as point-to-multipoint EVCs. This may alternatively be known as a one-to-many connection, or broadcasting, or multicasting. The method may include using Multi Protocol Label Switching (MPLS), or Multi Protocol Label Switching-Transport Profile (MPLS-TP), or an Ethernet Protocol for at least a part of the worker path 23 and/or the protection path 21 and/or the interface path 52.

The method may further include using a control message from one distribution node 20, 22 to the other distribution node 20, 22 to initiate switching traffic. The interface path 52 may be used for communication of the control message.

The above embodiment of FIGS. 1-7 describe 1:1 protection whereby the protection tree 21 is provisioned such that traffic is only switched to it upon receipt of the failure message 56. Such 1:1 protection is more desirable in view of the large bandwidth that tree architectures use. It will be appreciated that the above embodiment may be used with 1+1 protection whereby traffic in the metro network 14 is actively transmitted on both the worker tree 23 and the protection tree 21 via the interface path 52. With 1+1 protection the access nodes 24, 26, 28, 30 are responsible for deciding which traffic flow to use by switching to the desired traffic flow from the worker tree 23 or the protection tree 21. In the case of 1+1 protection for the failure 54 in the worker tree 23 as shown in FIG. 2 the failure message 56 to notify the distribution nodes 20 or 22 is not required. Should such a failure message 56 be received by the distribution nodes 20 or 22 no action is necessary. For 1+1 protection in the case of the failure 54, a Loss of Connectivity (LOCV) OAM message may be received at each of the access nodes 24, 26, 28, 30 to indicate switching to the protection tree 21. Overall from the perspective of the network operator the 1:1 protection is more appealing due to bandwidth saving considerations inside the metro network 14.

For the provision of 1+1 protection the method includes transmitting the traffic from each of the two edge switching devices 20, 22 of the metro network 14 to at least one access node 24, 26, 28, 30 of the metro network 14 using the working path and the protection path. The method then includes selecting the traffic flow to use at the at least one access node 24, 26, 28, 30.

In the case of 1+1 protection it will be appreciated that the protection mechanisms described with reference to FIG. 1-7 allow real time updating of the forward databases of the edge switching devices 20, 22. Such real time updating provides the added advantage that the possibility that traffic is lost in the event of the failure 54, 58 is reduced. This is because the destination of the replicated traffic is always stored in the forward database of either of the edge switching devices 20, 22. This means that the connectivity with the user nodes 32, 34, 36 and 38 is improved and loss of traffic is minimised. The embodiments of FIGS. 1-7 with 1:1 protection do not have this added advantage because the traffic on the protection path is not copied and the protection path is merely provisioned:

It will be appreciated that the above embodiments described in FIGS. 1-7 may be utilised with the known Virtual Router Redundancy Protocol (VRRP) whereby the edge router 16 is connected to each of the switching devices 20, 22, and the edge router 18 is connected to each of the switching devices 20, 22. Such a VRRP is an example of a Dual Homing Configuration. An advantage of the above described methods and apparatus is the ability to provide connection-oriented tree protection, for example, when a dual router configuration is used. The prior art VRRP used with tree connections typically require four tree connections to be configured and managed. In contrast, the embodiments of the invention described above only required two tree connections to be configured and managed which are the worker tree 23 from the edge switching device 22, and the protection tree 21 from the edge switching device 20. Such a reduction in Is trees from four to two decreases complexity in configuration and management of the network 10.

It will be further appreciated that the above embodiments may be utilised when only one edge router is used in the core network 12 which is connected to each of the switching devices 20, 22. In this example the above described embodiments may be used to protect trees 21, 23 from each of the switching devices 20, 22.

The above-described embodiments are particularly, but not exclusively, relevant to tree networks which can support video multicasting via a tree arrangement. The tree is a point-to-multipoint technology which is used to multicast traffic from the edge switching devices 20, 22, also known as head-end nodes, to the access nodes 24, 26, 28, 30.

The above-described embodiments have the advantage that the core network is not involved in protection mechanisms implemented by the metro network. Furthermore the edge switching devices 20, 22 of the metro network 14 are not required to participate in protocols or protection mechanisms related to dual homing configuration such as VRRP. In this manner the protection mechanisms of the core network 12 and the metro network 14 are largely independent. Switch traffic between the edge switching devices 20, 22 via the interface path 52 provides cost effective and efficient protection which consumes minimised resource when compared to prior art solutions. This may reduce cost and complexity of protection switching and may assist telecommunications operators to guarantee levels of service and quality of service.

Providing protection according to the embodiments of the invention has the advantage to improve network stability because traffic in the network is not rerouted unnecessary, which reduces inefficiencies in the network. For example, if traffic is rerouted there may be an increase of traffic congestion particularly in the case of multicast traffic composed of video or television services. Typically such video or television services use a dedicated protocol for traffic optimization such as Internet Group Management Protocol (IGMP) whereby protection switching usually requires such protocols to update their status to a new topology. In the case of protection switching for IGMP it is necessary to send video channel request messages to all nodes in a multicast protection path which results in a burst of control plane messages. Such a burst of control plane messages may cause traffic delivery inefficiencies to arise. A reduction of unnecessary protection switching, as provided by the embodiments of the present invention, reduces such inefficiencies and the associated disruptions in video or television services.

The invention claimed is:

1. A method of providing path protection in a communications network having a plurality of nodes including a plurality of access nodes, the method comprising:
setting up a connection-oriented worker path between a first distribution node and each one of the plurality of access nodes, where at least one of the connection-oriented worker paths includes an intermediate communication node between the first distribution node and the respective one of the plurality of access nodes;
switching, at the first distribution node, traffic received from a first upstream node, via a first connection, to the worker path;
setting up a connection-oriented protection path between a second distribution node and each one of the plurality of access nodes, where at least one of the connection-oriented protection paths includes an intermediate communication node different from the intermediate communication node of a respective connection-oriented worker path, wherein the second distribution node is configured to receive traffic from a second connection that is different from the first connection;
setting up a connection-oriented interface path between the first and second distribution nodes;
in response to detection of a fault in the worker path, switching, at the first distribution node, traffic received from the first upstream node, via the first connection, to the interface path and the second distribution node; and
switching, at the second distribution node, traffic received from the first distribution node, via the interface path, to the protection path, such that the first distribution node switches traffic from the first upstream node for both the working path and the protection paths.

2. A method of providing path protection in a communications network having a plurality of nodes including a plurality of access nodes, the method comprising:
setting up a connection-oriented worker path between a first distribution node and each one of the plurality of access nodes, where at least one of the connection-oriented worker paths includes an intermediate communication node between the first distribution node and the respective one of the plurality of access nodes;
setting up a connection-oriented protection path between a second distribution node and each one of the plurality of access nodes, where at least one of the connection-oriented protection paths includes an intermediate communication node different from the intermediate communication node of a respective connection-oriented worker path;
setting up a connection-oriented interface path between the first and second distribution nodes;
even when no fault is detected in the connection-oriented protection path, switching, at the second distribution node, traffic received from an upstream node, via an upstream connection, to the interface path, and switching the traffic sent on the interface path to the worker path at the first distribution node; and
responsive to detection of a fault in the worker path, switching traffic, at the second distribution node, traffic received from the upstream node, via the upstream connection, to the protection path.

3. A method according to claim 1, further comprising:
switching, at the second distribution node and when no fault is detected in the worker path, traffic received via the second connection to the interface path; and
switching, at the first distribution node, traffic received from the second distribution node, via the interface path, to the worker path.

4. A method according to claim 2, further comprising:
switching, at first distribution node, traffic received via another upstream connection to the worker path in response to a change of the first distribution node receiving the traffic.

5. A method according to claim 1 and further including sharing at least one common intermediate node in the worker path and/or the protection path to communicate with the at least one access node.

6. A method according to claim 1 and further including transmitting the traffic from the first or second distribution node to a plurality of access nodes.

7. A method according to claim 6 and further including multicasting the traffic from the first or second distribution node to the plurality of access nodes.

8. A method according to claim 1 and further including using a worker tree or a protection tree for at least a part of the worker path and/or the protection path.

9. A method according to claim 1 and further including using Multi Protocol Label Switching (MPLS), or Multi Protocol Label Switching-Transport Profile (MPLS-TP), or an Ethernet Protocol for at least a part of the worker path and/or the protection path and/or the interface path.

10. A method according to claim 1 and further including using a control message from one of the first and second distribution nodes to the other one of the first and second distribution nodes to initiate switching traffic.

11. A method according to claim 10 and further including using the interface path for communication of the control message.

12. A method according to claim 1 and further including using an edge node of a local network for at least one of the distribution nodes.

13. A method according to claim 1, wherein the first upstream node is an edge router of a core network.

14. A method according to claim 1, wherein the first and second connections are connection-oriented paths between the first and second distribution nodes and respective upstream nodes.

15. A node arrangement for a communications network having a plurality of access nodes, the node arrangement comprising:
a first distribution node and a second distribution node having a connection-oriented interface path therebetween;
the first distribution node operable to switch traffic that is received via a first upstream connection to a connection-oriented worker path to each one of the plurality of access nodes, where at least one of the connection-oriented worker paths includes an intermediate communication node between the first distribution node and the respective one of the plurality of access nodes;
the second distribution node configured to receive traffic via a second upstream connection and having a connection-oriented protection path to each one of the plurality of access nodes, where at least one of the connection-oriented protection paths includes an intermediate communication node different from the intermediate communication node of a respective connection-oriented worker path;
wherein, in response to a fault detected in the worker path, the first distribution node is operable to switch traffic received at the first distribution node, from the first upstream connection, to the interface path and the second distribution node; and
the second distribution node is operable to switch traffic received at the second distribution node, from the interface path, to the protection path, such that the first distribution node switches traffic received via the first upstream connection for both the working and protection paths.

16. A node arrangement for a communications network having a plurality of access nodes, the node arrangement comprising:
- a first distribution node and a second distribution node having a connection-oriented interface path therebetween;
- the first distribution node having a connection-oriented worker path to each one of the plurality of access nodes, where at least one of the connection-oriented worker paths includes an intermediate communication node between the first distribution node and the respective one of the plurality of access nodes;
- the second distribution node having a connection-oriented protection path to each one of the plurality of access nodes, where at least one of the connection-oriented protection paths includes an intermediate communication node different from the intermediate communication node of a respective connection-oriented worker path;
- even when no fault is detected in the connection-oriented protection path, the second distribution node operable to switch traffic received at the second distribution node, from an upstream connection, to the interface path;
- the first distribution node operable to switch traffic received at the first distribution node, from the interface path, to the worker path; and
- the second distribution node operable to, in response to detection of a fault in the worker path, switch traffic received at the second distribution node, from the upstream connection, to the protection path.

17. A node arrangement according to claim 15 wherein, during a period in which no fault has been detected in the protection path, the second distribution node is operable to switch traffic received at the second distribution node, from the second upstream connection to the interface path, and the first distribution node operable to switch traffic received from the interface path to the worker path.

18. A node arrangement according to claim 16 wherein the first distribution node is operable to switch traffic received via another upstream connection to the worker path in response to a change of the first distribution node receiving traffic via the another upstream connection.

19. A node arrangement according to claim 15 wherein the worker path and/or the protection path have at least one common intermediate node for communication with the at least one access node.

20. A node arrangement according to claim 15 wherein the first or second distribution node are operable to transmit traffic to a plurality of access nodes.

21. A node arrangement according to claim 20 wherein the first or second distribution node are operable to multicast the traffic to the plurality of access nodes.

22. A node arrangement according to claim 15 wherein at least a part of the worker path and/or the protection path include a worker tree and/or a protection tree.

23. A node arrangement according to claim 15 wherein at least a part of the worker path and/or the protection path and/or the interface path are operable to use Multi Protocol Label Switching (MPLS), or Multi Protocol Label Switching-Transport Profile (MPLS-TP), or an Ethernet Protocol.

24. A node arrangement according to claim 15 operable to initiate switching traffic using a control message from one distribution node to the other distribution node.

25. A node arrangement according to claim 24 wherein the interface path is operable for communication of the control message.

26. A node arrangement according to claim 15 wherein at least one of the distribution nodes is an edge node of a local network.

27. A node arrangement according to claim 15 wherein the first upstream connection is connected to an edge router of a core network.

28. A node arrangement according to claim 15 wherein the first and second upstream connections are connected-oriented communication paths with a respective upstream node.

* * * * *